UNITED STATES PATENT OFFICE.

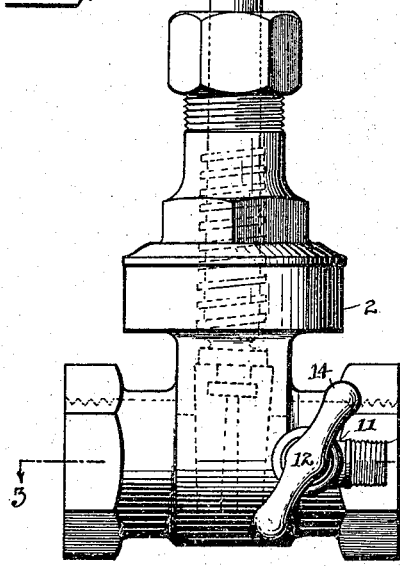

FRED SCHULDER, OF CLEVELAND, OHIO, ASSIGNOR TO UNITED BRASS MANUFACTURING COMPANY, OF CLEVELAND, OHIO, A PARTNERSHIP COMPOSED OF WM. J. SCHOENBERGER AND BENJAMIN F. KLEIN.

STOP AND WASTE VALVE.

1,228,060.      Specification of Letters Patent.     Patented May 29, 1917.

Application filed December 13, 1915. Serial No. 66,651.

*To all whom it may concern:*

Be it known that I, FRED SCHULDER, citizen of the United States, residing at Cleveland, in the county of Cuyahoga and State of Ohio, have invented certain new and useful Improvements in Stop and Waste Valves, of which the following is a specification.

This invitation appertains to valves, particularly a stop and waste valve having a waste nipple projected from the body thereof, the object being to provide a simple waste-valve attachment which is adapted to be rotated about the waste nipple and locked thereon in different discharging relations to the valve body.

In the accompanying drawings, Figure 1 is a side view, and Fig. 2 is an end elevation of a gate valve embodying my improvement. Fig. 3 is a plan view in section on line 3—3, Fig. 1. Fig. 4 is a cross section of a valve body and a modified form of waste-valve attachment therefor. Fig. 5 is a sectional view of my improved attachment showing a flat seating end for the waste valve.

As shown, the invention is applied to a gate valve 2 having a rotatable valve stem 3 and handle 4 adapted to control the main valve seats 5 in the main water passage 6 of the valve body. The opposite ends of the valve body are also screw-threaded internally for the supply and delivery pipes, but any suitable connection may be employed and the valve body and main valve operating parts may be constructed in other ways and according to other accepted standards. In any event, the valve body is assumed to be provided with a waste nipple 7 open to the delivery side of the main valve and arranged to drain the delivery pipe connections when the main valve is closed and the fluid supply is shut off. In the present case two such waste nipples 7 and 7' are shown located opposite one another on opposite sides of the delivery end of the valve body, each nipple having an open screw-threaded extremity and means to close the same. Thus one nipple 7' mounts a simple screw cap 8 and sealing washer 9 opposite the discharge end thereof, and the other nipple 7 carries a lock nut 10 and a rotatable nozzle 11 or discharge spout having a valve member 12 in screw connection therewith opposite the open end of said nipple.

Either right or left screw threads may be used to affix the nozzle to the nipple, but a left hand thread is preferred. Thus, in Figs. 1 to 3, nozzle 11 is shown as screw-engaged with the nipple 7 and as covering the outer end thereof to discharge the waste laterally through a short tubular extension 13 having external screw threads wherewith to make connection with a small pipe for the delivery of the waste to any distant point. The valve member 12 may be pointed as shown in Fig. 3, or flat at the inner end thereof as shown in Fig. 5, to close the waste orifice in the nipple. The inner end or head of this valve member is preferably slightly larger than the screw-threaded stem thereof to prevent the said member from being removed or detached from the nozzle, and an operating handle 14 is pinned or otherwise affixed to the outer end of the stem.

The screw cap 8 and the valved waste nozzle 11 are interchangeable, and by screwing the waste nozzle upon one of the two nipples it may be set to point its lateral extension 13 in any direction radially of the nipple and then tightly locked in that given position by the lock nut 10. Draining effects are then controlled by the valved member 12 without affecting any change in the set relations of the nozzle to the valve body. Such set relations are established when the valve body is installed or connected with the pipes and the surrounding walls or objects make it desirable or necessary to discharge the waste or to extend a waste delivery pipe in a given direction.

In Fig. 4 a waste nozzle 15 is rotatably mounted upon a projecting waste nipple 16 and held in place by a lock nut 16', but the valve member 17 in this arrangement is screw-engaged with the nipple instead of with the nozzle, and draining is effected through a diagonal opening 18 in the screw valve when the point of the valve is retired from the small waste orifice 19 in the valve body.

In lieu of placing the waste nipples on opposite sides of the valve body, two such nipples may be projected from the same side of the body but at opposite ends thereof, as indicated by full and dotted lines in Fig. 3.

The waste openings through the sides of the body are located inwardly from the end of the body and the pipes which connect with the internal screw threads might close said openings when connections are being made, but this is absolutely prevented in my valve by the use of one or more lugs 20 cast upon the inside of the body in the main water passage at the base of the internal screw threads 21.

What I claim is:

1. A valve body having a main water passage through the same and a valve adapted to open and close said passage and provided with a waste nipple at one side open to the delivery end of said valve body, in combination with an elbow shaped waste discharge member rotatably engaged with said nipple, and a valve for said nipple engaged in said member, and means to lock said discharge member in different set positions upon said nipple.

2. A valve body having an externally-threaded waste nipple, in combination with a waste discharge member of substantially elbow shape in rotatable screw engagement over said nipple, a lock nut mounted upon said nipple behind said discharge member and adapted to limit the same, and a valve to control the outflow of the waste adapted to seat in the end of said nipple.

3. A valve body having a waste nipple at its side, in combination with a waste discharge spout having rotatable screw connection with said waste nipple and a valve member mounted in said spout having an enlarged inner seating portion adapted to engage the end of said nipple and to prevent removal of said valve member from said spout.

In testimony whereof I affix my signature in presence of one witness.

FRED SCHULDER.

Witness:
R. B. MOSER.

Copies of this patent may be obtained for five cents each, by addressing the "Commissioner of Patents, Washington, D. C."